United States Patent
Forman et al.

(10) Patent No.: US 7,116,773 B2
(45) Date of Patent: Oct. 3, 2006

(54) REVERSE CALLER-IDENTIFICATION

(75) Inventors: George H. Forman, Port Orchard, WA (US); Henri Jacques Suermondt, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 480 days.

(21) Appl. No.: 10/054,028

(22) Filed: Jan. 22, 2002

(65) Prior Publication Data
US 2003/0138085 A1    Jul. 24, 2003

(51) Int. Cl.
H04M 3/42 (2006.01)
H04Q 7/20 (2006.01)
H04B 7/15 (2006.01)
H04M 1/64 (2006.01)

(52) U.S. Cl. .................. 379/207.15; 379/88.19; 379/209.01; 379/211.02; 379/214.01; 455/456.1; 455/462

(58) Field of Classification Search ........... 379/142.07, 379/88.19, 207.15, 214.01, 211.02, 209.01; 455/462, 456.1
See application file for complete search history.

(56) References Cited

U.S. PATENT DOCUMENTS

| | | | |
|---|---|---|---|
| 5,875,240 A * | 2/1999 | Silverman | 379/142.07 |
| 6,243,461 B1 | 6/2001 | Hwang | 379/372 |
| 6,546,096 B1 * | 4/2003 | Meiden et al. | 379/209.01 |
| 6,647,107 B1 * | 11/2003 | Horrer | 379/214.01 |
| 6,690,785 B1 * | 2/2004 | Stelter et al. | 379/211.02 |
| 6,760,413 B1 * | 7/2004 | Cannon et al. | 379/88.19 |
| 6,901,266 B1 * | 5/2005 | Henderson | 455/462 |
| 7,006,833 B1 * | 2/2006 | Contractor | 455/456.1 |

* cited by examiner

Primary Examiner—Wing Chan
Assistant Examiner—Thjuan P. Knowlin

(57) ABSTRACT

A reverse caller identification system. Telecommunications devices are registered with respect to specific locations and are monitored with respect to users proximity to said devices. Prior to putting an incoming call through to one of said devices, the caller is provided with information as to activities currently in proximity to that device. A plurality of options for real-time information data and caller feedback are described.

23 Claims, 4 Drawing Sheets

REVERSE CALLER-IDENTIFICATION

(2) CROSS-REFERENCE TO RELATED APPLICATIONS

Not Applicable.

(3) STATEMENT REGARDING FEDERALLY SPONSORED RESEARCH OR DEVELOPMENT

Not Applicable.

(4) REFERENCE TO AN APPENDIX

Not Applicable.

BACKGROUND OF THE INVENTION (5.1) Field of the Invention

The present invention relates generally to telecommunications.

(5.2) Description of Related Art

Telecommunications apparatus, such as telephones (wired or wireless), facsimile machines, answering machines, paging devices, and the like, have become ubiquitous tools of both business and domestic environments. While offering convenience and facilitating interpersonal contact and information exchange, such devices may also serve as a source of aggravation and annoyance. A number of mechanisms such as voice mailbox, call forwarding, call waiting, call screening, call blocking, and caller identification (commonly known as "Caller ID," or simply "CID") have been developed to improve telecommunication services.

The function of a CID system is such that when a call rings, the receiver is able to obtain the calling-party telephone number and other related information to decide whether to take the call. The protocol of sending a CID was developed by Bell Communications Research. When a call is dialed, the data message of the CID is sent from the switchboard to the destination every two seconds. Referring to FIG. 1 (Prior Art), the protocol for sending a CID is arranged in a time sequence, in which a ring 10 is sent first. About 0.5 second later, a signal of channel seizure 11 is sent. Next, a mark 12 with 150 milliseconds (ms) duration is sent. Finally, the data message 13, including the data message of the CID is sent. A subsequent ring 14 is sent a few seconds later, initiating the next cycle. CID is sent by utilizing a modularizing method of frequency shift key (FSK) in which, e.g., a frequency of 1200 Hz represents the logic state "1," a frequency of 2200 Hz represents the logic state "0," and the sending rate is 1200 bits per second (bps). The signal of the channel seizure 11 is formed in a series of logic data mixed with a number of "0" and "1." Following that, a signal mark 12 is in a form of continuous logic state "1." The first logic state "0" after the mark 12 is interpreted as an end of the mark. Then the date, time, and telephone number grouped as the information of the CID data message are sent immediately after the mark 12.

When calling in to a telecommunications apparatus located in a meeting room or other location, such as for a teleconference, the incoming call can interrupt an on-going activity in that room that is otherwise unknown to the caller. Even with CID in use at the target location, the call still immediately rings through, causing the interruption. Similarly, wrong number calls immediately ring through, also causing an interruption.

Relying on a busy signal sent to the caller provides very little feedback information with respect to real-time information about the activities at the target location; only an immediate status (that line is either busy or not busy) is relayed back to the caller from the target location. Even with the addition of add-on features such as automatic ring-back type information or number dialed information (e.g., an automated dialer displaying the number called and an identification label, e.g., "Mr. White 911-555-1212"), there is still no further information regarding activities at the target. An automated voice mail, immediate status reply to the caller (e.g., "I am on vacation until eight a.m. next Tuesday.") requires prior arrangement and relatively continual updating; moreover, such automated absentee voice mail generally does not currently allow putting a call through after that message.

Taking a planned teleconference in a conference room as an exemplary activity, to avoid such interruptive problems, one might not call the conference room itself, but instead call a cellular telephone of one of the known participants to determine if all is in order for the planned teleconference. Then, however, assuming all is ready, that cell phone call must be transferred to the teleconference phone or another call directly dialed thereto. This is also a procedure that is interruptive of current activities of the known participant and there is no real-time information regarding the target location if the known participant has not arrived there.

Another solution is to use a bridge line where each participant calls into a hub. However, this requires set-up in advance of each conference; the participants must keep track of a unique meeting identification; and the meeting participants must all call the bridge at the designated time. Again, this is also a relatively expensive solution. This solution is relatively inconvenient in station-to-station situations (e.g., a single remote attendee calling a conference room), as it requires active rather than passive measures by all parties.

Another solution is to use call-forwarding. The remote participants call the office telephone number of one of the on-site participants who forwards his or her line to the conference room number at the set time for the meeting. However, note that the forwarded call may still interrupt a prior activity at that room which has run into overtime. Such forwarding is subject to other problems such as forwarding to the wrong number, the continued forward of calls into the meeting unless call forwarding is canceled after all participants are logged in, or the like. The on-site participant must remember to cancel call forwarding.

Another solution is to have a live receptionist who can monitor each conference room and scheduled teleconferencing activities in real time. Obviously, this is an expensive solution.

None of the prior solutions are convenient, economical nor effective in the long term. Thus, there is a need for a system which allows a caller to avoid interrupting such an on-going activity and obtain real-time information regarding the local environment at the target location. In other words, there is a need for an electronic system which acts much in the same way that on-site participants to an activity at a given location can perform, such as looking into the location through a window and determining if it is occupied, and by whom, prior to entering and without causing a disruption. The system described herein is adaptable to a variety of other implementations such as home use, wrong number recognition, automated routing of calls, away-from-the-phone determination mechanisms, and the like.

BRIEF SUMMARY OF THE INVENTION

In its basic aspects, embodiments of the present invention relate to telecommunications. A telecommunications call system accordingly includes a telecommunications device. Associated with said telecommunications device, a call-processor has an input-output port for transmitting call signals to said telecommunications device. Associated with said call-processor, sensors provide real-time information signals indicative of real-time activity proximate said call-processor. The call-processing thus conveys information to a caller prior to putting the call through to said telecommunications device. Also, a method is detailed for method for processing an incoming call from a caller to a specified telecommunications device. The method includes: receiving the incoming call; obtaining real-time information regarding the environment proximate said device; transmitting said real-time information to said caller; and based on feedback from said caller, taking appropriate action for processing said incoming call.

The foregoing summary is not intended to be an inclusive list of all the aspects, objects, advantages and features of the embodiments of the present invention nor should any limitation on the scope of the invention be implied therefrom. This Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches. Objects, features and advantages of the embodiments of the present invention will become apparent upon consideration of the following explanation and the accompanying drawings, in which like reference designations represent like features throughout the drawings.

The drawings referred to in this specification should be understood as not being drawn to scale except if specifically annotated.

DETAILED DESCRIPTION OF THE INVENTION

In general, embodiments of the present invention as now described relate to methods and apparatus for implementing determination by remote inquiry to a location regarding current occupancy or other real-time information about the proximate environment to a telecommunications device or plurality of such devices and locations. Reference is made now in detail to specific exemplary embodiments of the present invention which illustrate the best mode presently contemplated for practicing the invention. Alternative embodiments are also briefly described as applicable.

Figure 1:
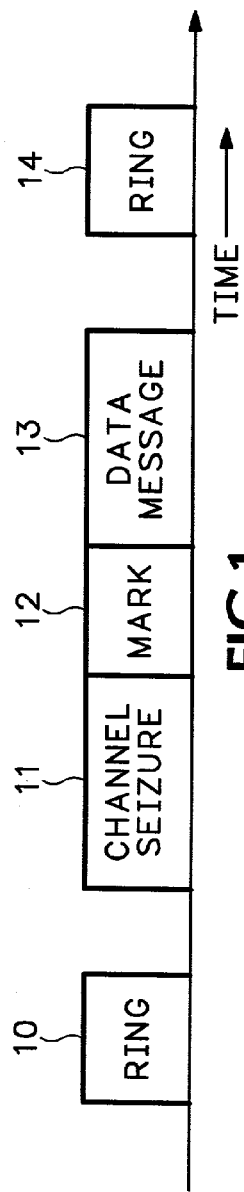
FIG. 1 (Prior Art) is a typical Caller ID system protocol.
Figure 2:
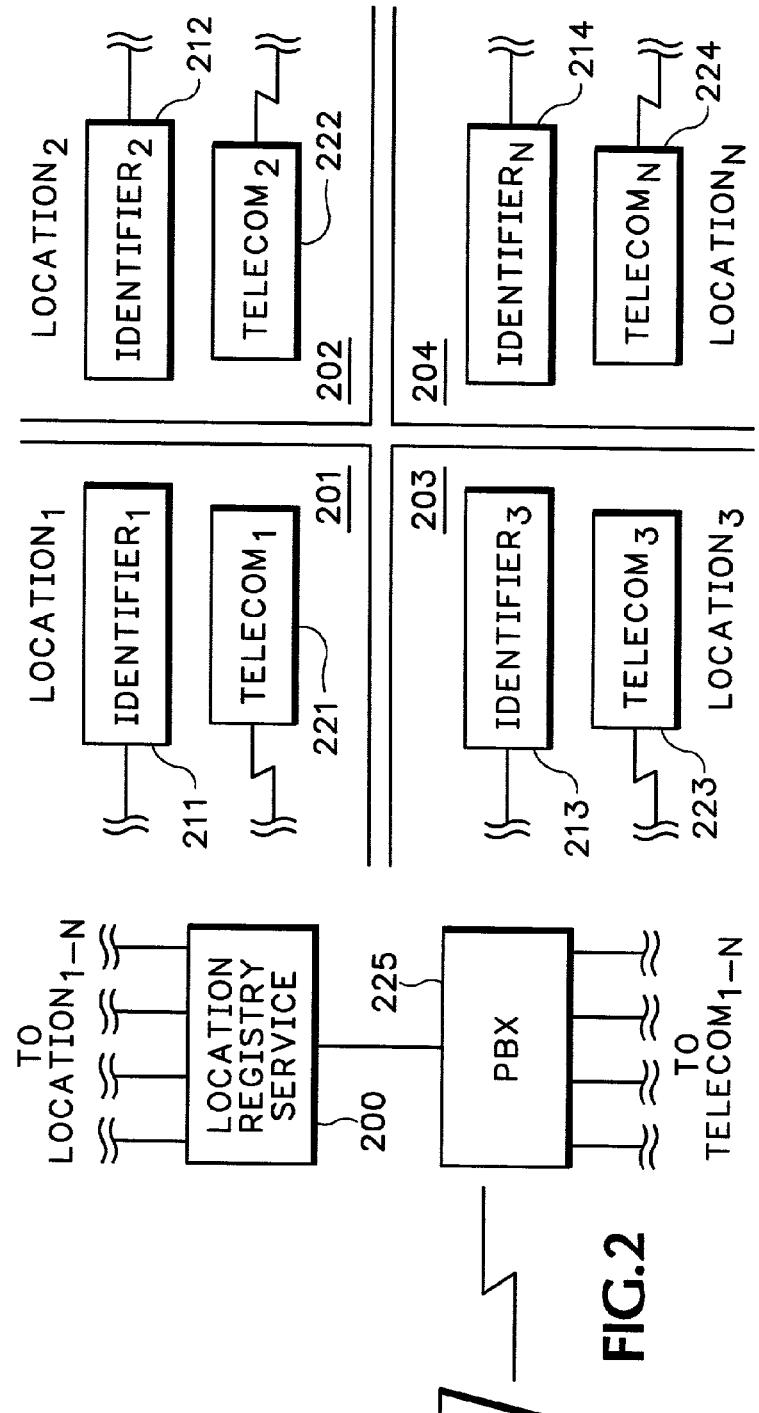
FIG. 2 is a schematic block diagram of the system for Reverse Caller ID in accordance with embodiments of the present invention.

Turning to FIG. 2, a location registry service 200 is provided in a known manner. The function of the location registry service 200 is to identify and register information relevant to on-going activities in using or in the vicinity of a fixed location telecommunications apparatus. Note that what is required is an ability for each of one or more location telecommunications apparatus to make such information in real-time available to the registry. To describe the embodiments of the present invention, the example of teleconference room locations started in the Background section, supra, is continued. Assume that a teleconference is planned by specific participants for a particular time in a particular room. It is important for those participants to therefore have assurance that the proper room and time and personnel are targeted for attending the teleconference. A CID protocol system (see FIG. 1) is optionally in place.

The use of known technology for personnel identification can be employed in accordance with the embodiments of the present invention. For example, for security reasons, corporations often have identification badges which are required to be worn by employees. Such badges can employ radio frequency identification devices ("RFID"), magnetic stripe coding, or personal transponder signaling techniques, or the like, whereby computer tracking of an individual's current whereabouts is known (generally, as long as the individual is on-site), including their presence in any particular, monitored teleconference room. As other examples, a person's whereabouts can be determined by video or voice print methods, wireless networking communications (e.g., from a personal computer, personal digital assistant ("PDA"), or the like. As another example, a personal infrared ("IR") transmitter-receiver system can be employed where each employee has a wristwatch or PDA having a coded signal which is tracked by fixed receivers in each room, or other addressable locations such as cubicles, of an office facility; alternatively, IR beacons fixed in a location may signal to a PDA where it is such that it can transmit its location via the network.

Figure 5:
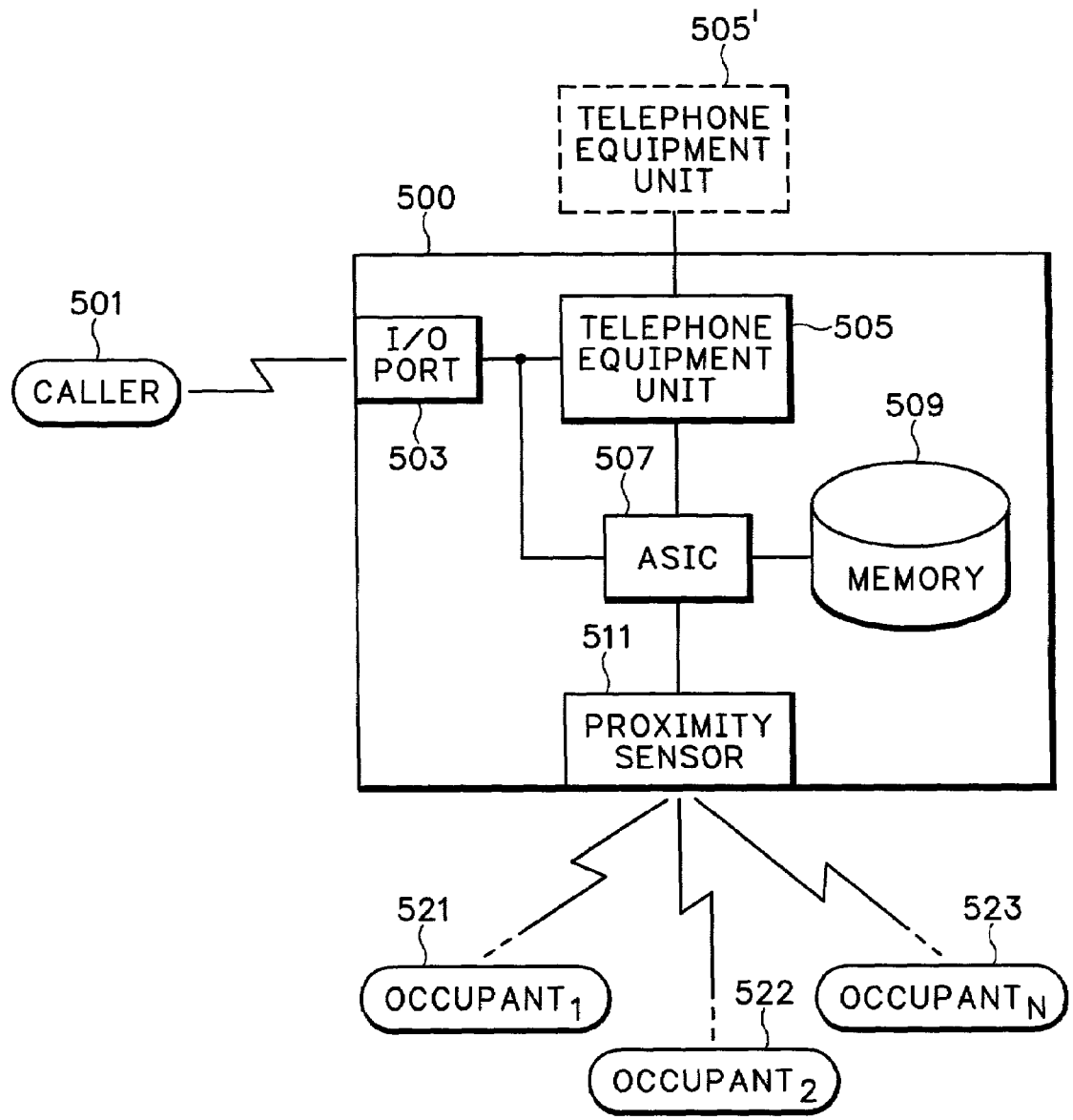
FIG. 5 is schematic block diagram of an alternative embodiment of the embodiments of the present invention shown in FIG. 2.
Figure 6:
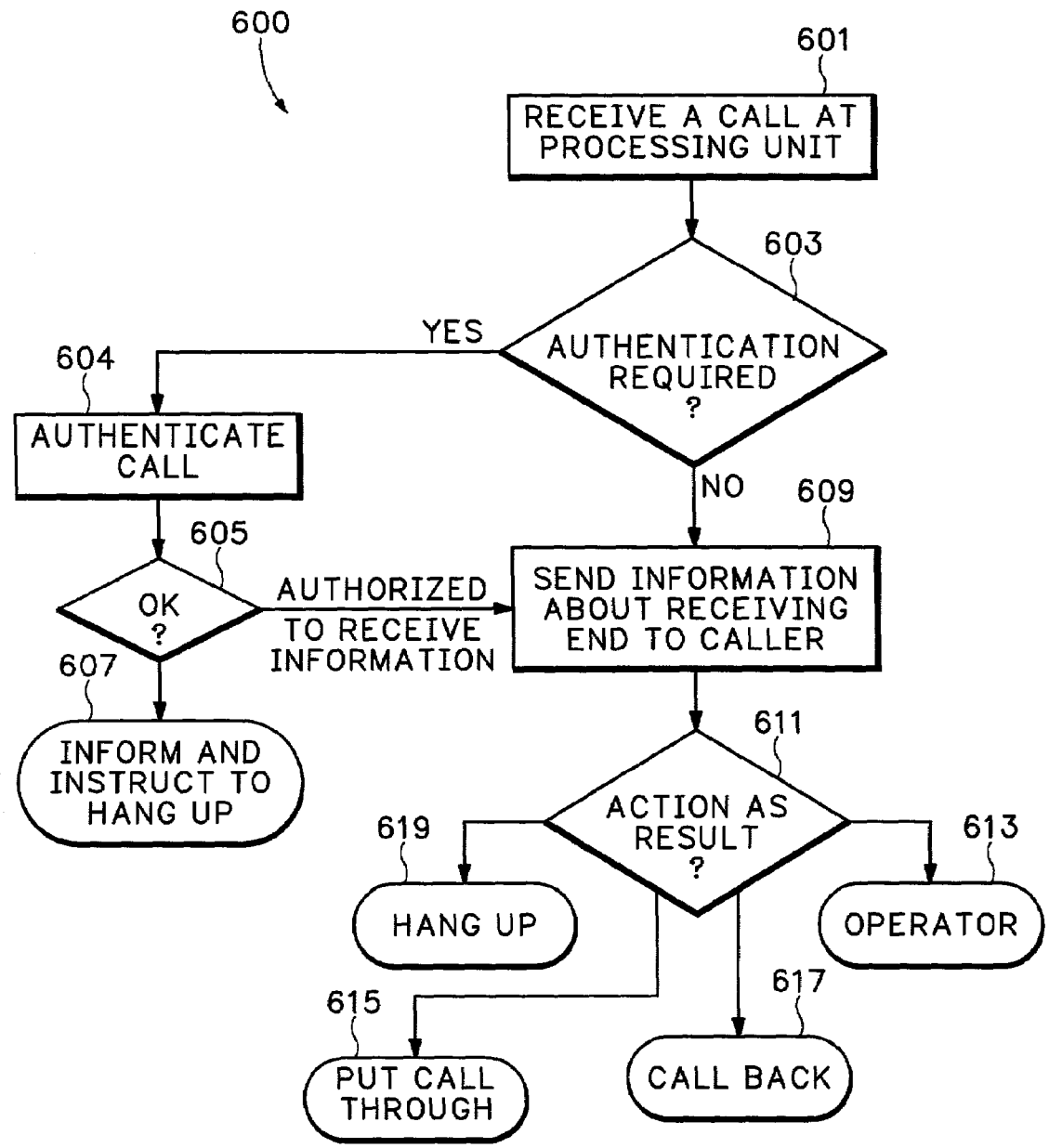
FIG. 6 is a flow chart of a simplified process in accordance with embodiments of the present invention.

Using the latter as an exemplary embodiment with respect to FIG. 2, each teleconference room 201, 202, 203, 204 of a facility (or even just a single location, discussed further with respect to FIGS. 5 and 6) is provided with a unique address identification—"LOCATION$_{1-N}$"—and a corresponding IR location identifier 211, 212, 213, 214 (shown as a box labeled "IDENTIFIER$_{1-N}$") connected to the programmable location registry service 200. Any employee in the room 201, 202, 203, 204 will be identified as present by the respective identifier 211, 212, 213, 214 picking up the transmitted code from the employee's badge, watch, or PDA upon entering that room. The location address associated with the room 201, 202, 203, 204 and the respective identifier 211, 212, 213, 214 therein is also assigned to the telephone 221, 222, 223, 224 (represented by a box labeled "TELECOM$_{1-N}$") in that same room. The programmable location registry service 200 (e.g., on-line server of the facility's network; not shown) is compatible with and connected to the main incoming call routing switchboard (e.g., a PBX) 225, or other programmable call router, which is connected in a known manner for routing calls at the facility. All the conference rooms 201, 202, 203, 204 and associated telephones 221, 222, 223, 224 are registered 300 with specific addresses via the location registry service 200.

Note that the location registry service 200 is an active, dynamic service, constantly aware in real-time of the presence (or non-presence by inference) of any employees at each preselected and monitored location of the facility.

Figure 3:
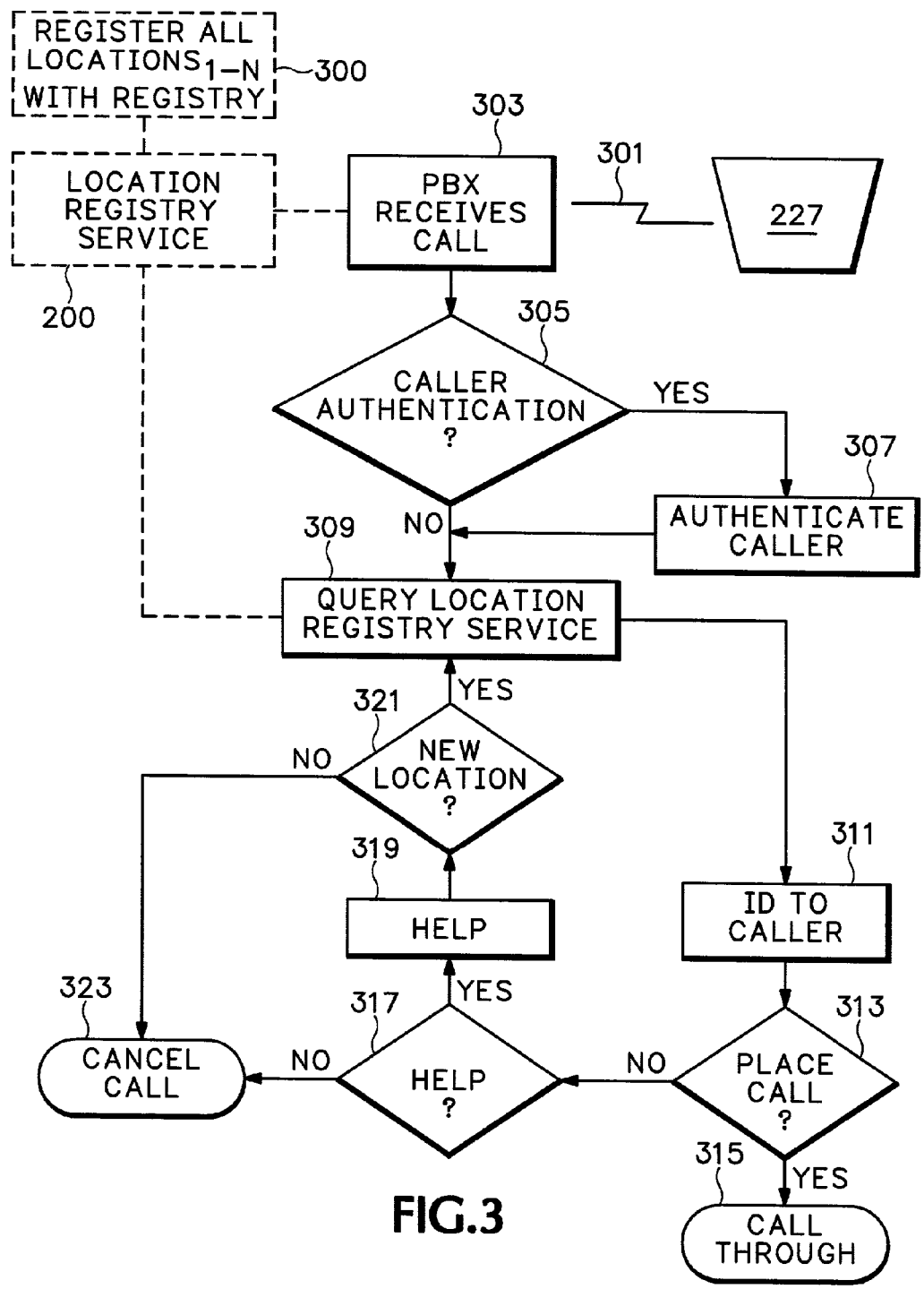
FIG. 3 is a flow chart of the process of operation of the system as shown in FIG. 2.

The operation in accordance with the embodiments of the present invention as shown in FIG. 3 provides the reverse caller-identification, "RCID,"—or "callee identification"—feedback to the caller. A caller 227 calls 301 a specific number, e.g., the direct dial number for the telephone 222 of room 202 which is received 303 by the PBX. The PBX checks the location registry service 200, determining for the purpose of explaining the embodiments of the present invention in this case that the number called is in fact one of the registered extensions (if not, the call is simply patched through).

As an option, since meeting participants in room 222 might be concerned about having their identity given away by telephone due to industrial espionage concerns and the like, an authentication 305 of the caller, or at least the call origination location as being on-site, may be required. If required, step 305, YES-path, any known manner caller authentication 307 can be employed, e.g., automated CID matching to employee extensions, employee home phone lists, caller dial-in pass codes, voice print matching, or the like.

Once the caller 227 is authenticated 307, or if no authentication option is employed, step 305, NO-path, the PBX 225, before patching the incoming call 301 to room 222, accesses 309 the location registry service 200 current database information on the presence (and inferentially, non-presence when looking for a specific individual) of all of the current occupants of room 222. The identifications retrieved from the database of the location registry service 200 are then transmitted 311 to the caller 227. For example, as with automated voice mail, the caller receives a message: "The Cascade Conference room current occupants are George Forman, Jaap Suermondt, and Eugene Valet. If you wish to ring through, press ONE now; press ZERO to be transferred to an attendant; or otherwise please hang-up."

One particularly beneficial option is allowing continued action by the caller following receipt of initial feedback information (e.g., when a caller is not satisfied with a roster of persons in proximity to the IDENTIFIER sensors). For example, the caller is allowed to hold and monitor periodic changes in the real-time information indicative of activity proximate the addressed location. Another particularly beneficial option is to allow the caller to obtain further information from the proximity sensor mechanisms, e.g., "press 9 for a video snapshot of the room."Still another particularly beneficial option is allowing said caller to disconnect and receive an automated callback based on predetermined changes of said real-time information, e.g., each time a new person comes into the room and the registry is updated.

Note that for some implementations another identification code rather than the personal identification of each person at the location queried may be preferable. For example, $LOCATION_3$ may be an auditorium holding several hundred participants. An auxiliary bypass can be provided such that the participants may inform the location registry service of a general identification of the on-going activity for that room, e.g., a signal representative of "SHAREHOLDERS MEETING, 1 P.M. to 5 P.M." or the like. As another example, the RCID information may be the number dialed in to and a daily schedule for that line. Other RCID information messages can be tailored to a specific implementation the present invention.

The caller 227 is then queried 313 as to whether or not to place the call 301 through to the dialed number. If the room 222 occupants are identified from the identification information received 311 from the PBX as those the caller is trying to reach, the call is put through 315. If the identification information indicates that a mistake has been made, an option 317 can be provided to the caller 27 to receive help. For example, the process may patch 319 the call 301 through to a facility operator, a facility automated directory, or the like, wherein a new room direct dial number is accessed 321, YES-path, and the RCID identification information process 309–313 is repeated. Another feedback-help subprocess may be to provide feedback information as to the length of occupancy of the identified occupants. Another help subprocess may be to monitor proximity to the target site by having a similar identifier unit in the hall outside the room. Other such feedback-help subprocesses can be developed in accordance with a specific implementation. Otherwise (321, NO-path), the call is terminated 323.

As an alternative to targeting specific locations for status information as to persons in the vicinity, once the location registry service is implemented 200, 300, in some circumstances it may be preferable to have the caller dial the PBX 225 and request whichever $LOCATION_{1-N}$ their desired party is already in; in other words, to target an individual rather than a location. A smart PBX can route the call appropriately after querying the location registry service 200 current database for where the intended recipient is located.

As an alternative to providing LOCATION current occupancy, with the advent of video-phones, video-conferencing, rather than a string of occupant identifications, a still photograph of the conference room can be transmitted to the caller. Similarly, a video or audio snippet from the current conversation within the room can be transmitted to the caller. Both of these alternatives impose the possible need for higher security measures, such as including a possible warning to the room that an audio-visual snapshot is about to be made, identity of the call, and the like as is appropriate to a specific implementation.

Figure 4:
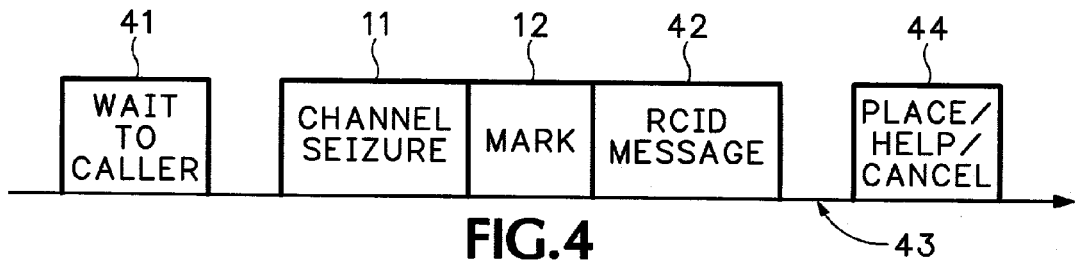
FIG. 4 is an exemplary protocol for implementing a reverse caller-identification system in accordance with embodiments of the present invention as shown in FIGS. 2 and 3.

FIG. 4 is an exemplary PBX protocol. As with the prior art, when a call comes in to the PBX 225 (FIG. 2) having CID protocol 10, 11, 12, 13 (FIG. 1), the PBX will return a WAIT protocol message 41. The PBX 225 obtains the RCID information from the location registry service 200 and returns the RCID message 42 (FIG. 3, 311) and action request (FIG. 3, 313) to the CALLER. Following a return of the occupancy information (e.g., an automated voice stating: "Mr. Jones and Mr. Smith are currently at that location,") the caller then takes an instructed action (e.g., pressing #1 to PLACE, #2 for HELP, #3 to CANCEL), thereby transmitting an appropriate protocol 44 to the PBX 225 for appropriate processing.

In an alternative embodiment of the present invention, the PBX 225 and location registry service 200 can be an integrated unit, e.g., a computer having on-board telephone and call routing subsystems.

Turning now to FIG. 5, this embodiment of the present invention is implemented in a stand-alone integrated RCID unit 500. In this embodiment, one or more locations, e.g., teleconference rooms is provided with a unit 500 which has a direct dial-in number. The caller 501 dials the location's unit 500 which receives the call via any known manner, wired or wireless port 503. The unit 500 includes both the necessary state-of-the-art telecommunications equipment 505 and a processor 507 including a memory 509. Further, the unit 500 includes a proximity detector device 511 for identifying those present within the range of the detector device 511, $OCCUPANT_{1-N}$. The processor 507 essentially includes the programming needed for authentication of the caller, proximity detection, and feedback information transmission. This simplified process 600 is shown in FIG. 6.

The call is received 601 by the unit 500. Caller authentication is performed substantially as in the embodiment of FIG. 3, here shown as steps 603, 604, and 605. Once a determination has been made regarding the caller 501, viz., step 603, NO-path or from step 605, and assuming the call is not terminated 607, information gathered by the proximity detector device 511 and stored in memory 509 is sent 609 to the caller 501, including instructions on proceeding after hearing the information. The unit 500 waits for further action feedback the caller 611, e.g., pressing "0" to be transferred 613 to an operator, pressing "1" to ring 615, pressing "2" for a call back 617, simply hanging up to terminate, or the like as fits a specific implementation. Note that with respect to FIG. 5, the telecommunications equipment 505 can be moved outside (indicated in phantom) the box 500 such that a "real-time smart" answering machine implementation may be constructed, e.g., for use with an ordinary telephone. The box 500 can then be moved from location-to-location.

Thus, embodiments of the present invention provide a complete reverse caller identification system. Telecommunications devices are registered with respect to specific locations and are monitored with respect to users proximity to said devices. Prior to putting an incoming call through to one of said devices, the caller is provided with information as to activities currently in proximity to that device.

The foregoing description of the preferred embodiment of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . ." and no process step herein is to be construed under those provisions unless the step or steps are expressly recited using the phrase "comprising the step(s) of . . . ."

What is claimed is:

1. A telecommunications call system comprising:
    a telecommunications device;
    associated with said telecommunications device, call-processing means for processing a call, having an input-output port for transmitting call signals to said telecommunications device;
    associated with said call-processing means, sensing means for activity of plural persons that are proximate the sensing means and for providing real-time information signals indicative of said real-time activity to said call-processing means,
    wherein said call-processing means conveys said information signals to a caller on a call into said input-output port prior to putting the call through to said telecommunications device.

2. The system as set forth in claim 1 further comprising;
    connected to said call-processing means, an incoming call line and an outgoing call line;
    connected to the incoming line a cell router;
    a plurality of location-identifiable telecommunications devices connected to the incoming line via the router; and
    accessible to said router, a database having real-time information representative of current proximity of individuals to each of said telecommunications devices, wherein said router provides said real-time information signals back to the caller to a specific one of said telecommunications devices prior to muting a call thereto.

3. The system as set forth in claim 1 wherein said real-time information is a roster of persons in proximity to said sensing means.

4. The system as set forth in claim 1 wherein said real-time information is at least one photograph image.

5. The system as set forth in claim 1 wherein said real-time information is audio playback of current persons in proximity to said telecommunications device.

6. The system as set forth in claim 1 wherein said real-time information is a signal representative of on-going activity of persons proximate to said telecommunications device.

7. The system as set forth in claim 1 further comprising:
    means for authenticating identity of said caller prior to said call-processing means conveying said information signals to said caller on a call into said input-output port.

8. The system as set forth in claim 1 further comprising:
    means for providing said caller with a plurality of options for further action following receipt of said real-time information.

9. The system as set forth in claim 8 wherein said plurality of options includes obtaining additional said real-time information.

10. The system as set forth in claim 2 further comprising:
    registry means for maintaining an active real-time database in a memory for said plurality of location-identifiable telecommunications devices.

11. The system as set for in claim 1 wherein said real-time information is gathered and kept current automatically.

12. A reverse caller-identification apparatus coupled to at least one telecommunications device, the apparatus comprising:
    real time information storage device for collecting and storing data representative of identities of plural people proximate said telecommunications device; and
    a processing device for associating an incoming call from a first known location to said telecommunication device at a second known location to said data and for transmitting said data to said first known location prior to routing said incoming call to said second known location.

13. A method for processing en incoming call from a caller to a specified telecommunications device, the method comprising:

receiving the incoming call;

sensing real-time information regarding identities of persons in an environment proximate said telecommunications device;

transmitting said real-time information to said caller prior to placing the incoming call through to the telecommunications device; and based on predetermined feedback from said caller, taking appropriate action for processing said incoming call.

14. The method as set forth in claim 13 wherein said real-time information includes a roster of persons proximate said telecommunications device.

15. The method as set forth in claim 13 wherein said real-time information includes an image, video, or audio snapshot of the environment proximate said telecommunications device.

16. The method as set forth in claim 13 wherein said real-time infonnation includes abstract information regarding activity proximate said telecommunications device.

17. The method as set forth in claim 13 further comprising:

prior to said transmitting said real-time information to said caller, authenticating said caller as authorized for receiving said real-time information.

18. The method as act forth in claim 13 further comprising:

providing said caller with a plurality of options for actions to take based on content of said real-time information.

19. The method as set forth in claim 18 wherein said plurality of options includes allowing said caller to hold while monitoring periodic changes in said real-time information.

20. The method as set forth in claim 18 wherein said plurality of options includes allowing said caller to obtain additional said real-time information.

21. The method as set forth in claim 18 wherein said plurality of options includes allowing said caller to disconnect and receive an automated callback based on predetermined changes of said real-time information.

22. The method as set forth in claim 13 wherein said real-time information is automatically updated.

23. A method for processing an incoming call to a telecommunications device at a first location, the method comprising:

monitoring said first location for indentities of individual within a known proximity to said first location;

receiving a call having a first protocol to said telecommunications device from a second location;

prior to connecting said call to said telecommunications device, transmitting a signal representative of said identities of individual to said second location using a second protocol;

waiting for a return signal representative of instructions regarding said patching of said incoming call.

* * * * *